US012617111B2

(12) United States Patent
Zhou

(10) Patent No.: US 12,617,111 B2
(45) Date of Patent: May 5, 2026

(54) PAPER CUTTER

(71) Applicant: Youqing Zhou, Xiangtan City (CN)

(72) Inventor: Youqing Zhou, Xiangtan City (CN)

( * ) Notice: Subject to any disclaimer, the term of this patent is extended or adjusted under 35 U.S.C. 154(b) by 132 days.

(21) Appl. No.: 18/734,642

(22) Filed: Jun. 5, 2024

(65) Prior Publication Data

US 2025/0360640 A1 Nov. 27, 2025

(30) Foreign Application Priority Data

May 22, 2024 (CN) ......................... 202421136822.8

(51) Int. Cl.
*B26B 27/00* (2006.01)

(52) U.S. Cl.
CPC .................................... *B26B 27/00* (2013.01)

(58) Field of Classification Search
CPC .......... B26B 27/00; B26D 1/04; B26D 1/045; B26D 1/065; B65D 83/0882; B65D 83/0841; B65H 35/002; B65H 2301/515; B65H 2301/515123; B65H 2301/515126; B65H 2301/51512
See application file for complete search history.

(56) References Cited

U.S. PATENT DOCUMENTS

| | | | | |
|---|---|---|---|---|
| 4,197,774 A * | 4/1980 | Singh | B26D 7/025 | 83/614 |
| 6,105,481 A * | 8/2000 | Schuler | B65H 35/0086 | 83/578 |
| 11,717,977 B1 * | 8/2023 | Xie | B26B 3/08 | 30/278 |
| 2004/0237746 A1 * | 12/2004 | Schultz | B65H 35/0086 | 83/614 |
| 2012/0111169 A1 * | 5/2012 | Blalock | B26B 3/08 | 83/614 |

FOREIGN PATENT DOCUMENTS

| | | | |
|---|---|---|---|
| DE | 9111783 U1 * | 11/1991 | |
| FR | 2474459 A3 * | 7/1981 | B65D 83/0835 |
| KR | 20130109334 A * | 10/2013 | B65D 25/52 |

* cited by examiner

*Primary Examiner* — Jennifer S Matthews

(57) ABSTRACT

The present application discloses a paper cutter, which is particularly suitable for cutting roll paper, including a hollow cylinder body and a cutting blade. The cutting blade is slidably mounted on a sliding rail structure, so that the cutting blade is detachably connected to the hollow cylinder body. The paper cutter is stable in cutting process and good in cutting quality; the blade is quick and convenient to mount, and the cutting blade can be directly pushed into the sliding rail structure from the bottom of the hollow cylinder body, and to demount or replace, the blade can be pulled out of sliding rails, which is also quick and convenient.

9 Claims, 6 Drawing Sheets

PAPER CUTTER

CROSS-REFERENCE TO RELATED APPLICATIONS

The application claims priority of Chinese patent application CN2024211368228, filed on May 22, 2024, which is incorporated herein by reference in its entireties.

TECHNICAL FIELD

The present application relates to the field of stationery supplies, and particularly relates to a paper cutter.

BACKGROUND

Cutting paper, especially roll paper (paper rolled into a cylindrical shape, such as gift wrapping paper), is a common task in daily life and work. The most traditional way is to use cutting tools such as cutting knives and scissors to cut, by which there are deficiencies of curved cutting paths thereof, deckled edges, not ideal cutting effect and low standardization degree.

For this purpose, a special cutter for roll paper arises, which is of a hollow cylinder-like structure, a side wall of the cylinder may be provided with a strip-shaped slot, and a sharp cutting blade may be mounted inside the tail end of the strip-shaped slot. The working principle of such a roll paper cutter is as follows: a free end of the roll paper is unrolled by a certain length, a roll tube portion of the roll paper is sleeved into a hollow sleeve of the cutter, at the same time, the edge of unrolled paper is inserted into the strip-shaped slot of the paper cutter and clamped and fixed by the strip-shaped slot, and a position to be cut on the edge of the paper abuts against the cutting blade. Then the cutter is pushed forward by a hand along an extension direction of the strip-shaped slot, thereby enabling the blade to cut off the paper. The prior art and the working principle of such the roll paper cutter can refer to the Chinese utility model "Paper Cutter" with the publication number CN219255676U.

In an existing roll paper cutter, in order to mount the cutting blade, the strip-shaped slot provided on the side wall of the cylinder usually has two structural forms. (1) One end of the strip-shaped slot is an open end, and the other end thereof is a closed end, and the cutting blade is fixedly mounted inside the closed end; and before cutting, the edge of the paper is inserted into the strip-shaped slot from the open end and slides to the closed end all along the opening of the strip-shaped slot until abutting against the cutting blade. The paper cutter disclosed in the Chinese utility model CN219255676U adopts this structure form. Since the structure of this type of slot has a good guiding effect on the paper, the paper will be limited and fixed when sliding to the closed end, and a cutting edge of the blade will be consistently and stably aligned with the edge of the paper, thereby realizing a stable cutting process. However, the blade is inconvenient to mount, demount and replace. When mounted, the blade needs to be pressed into the strip-shaped slot from up to down, and after being mounted, the blade is harder to demount from the slot. (2) The strip-shaped slot is in the form of a through slot, i.e., both ends of the slot are open ends; the limiting and fixing effect of this type of through slot on the paper is not good enough; and in the cutting process, the cutting edge cannot be stably aligned with the edge of the paper. Specifically, when the edge of the paper slides to the cutting edge along the through slot, two sides of the paper will be constrained by a side wall of the slot. However, since the through slot lacks a closed end, the paper is not constrained in the direction of the end. As a result, the paper is prone to swinging back and forth, and the cutting edge of the blade cannot be consistently and stably aligned with the edge of the paper, which may easily affect the cutting quality.

SUMMARY

To overcome the deficiencies of the prior art, the purpose of the present application is to provide a paper cutter that can address the problems of the inconvenience of blade mounting and demounting as well as misalignment of the blade in existing paper cutters.

The present application is implemented via the following technical solution:

A paper cutter comprises a hollow cylinder body, and the hollow cylinder body is internally provided with a hollow passage for a roll-like structure to pass through; a side wall of the hollow cylinder body is provided with a strip-shaped slot forming a paper feed passage; a sliding rail structure is provided on the side wall of the hollow cylinder body; the sliding rail structure extends to the bottom of the hollow cylinder body; one end of the sliding rail structure close to the bottom of the hollow cylinder body is provided with a bottom opening suitable for sliding insertion of a cutting blade, and the sliding rail structure is internally provided with a limiting structure for abutting against the cutting blade; the cutting blade is slidably inserted and connected in the sliding rail structure; and when the cutting blade is mounted in the sliding rail structure, a cutting edge of the cutting blade directly faces the paper feed passage.

Further, the sliding rail structure comprises two sliding rails arranged symmetrically along two sides; two sides of the cutting blade are provided with sliding connecting portions, and the sliding connecting portions are matched with the sliding rail structure and are suitable for mutual sliding.

Further, a boss structure is provided on a top surface of the cutting blade in a protruding manner to facilitate pushing and pulling the blade by a hand, and the boss structure is located at one end of the cutting blade opposite to the cutting edge.

Further, one end of the sliding rail structure is an opening for the sliding connecting portions to enter, and the other end thereof is a closed limiting surface; and when one end of each of the sliding connecting portions close to the cutting edge abuts against the limiting surface of the sliding rail structure, the cutting edge of the cutting blade directly faces the paper feed passage.

Further, the side wall of the hollow cylinder is provided with a limiting protruding column protruding therefrom, and the limiting protruding column is located between the two sliding rails; a bottom surface of the cutting blade is provided with a bottom sliding groove, and the limiting protruding column is provided in the bottom sliding groove; and when the bottom sliding groove abuts against the limiting protruding column and limits the cutting blade, the cutting edge of the cutting blade directly faces the paper feed passage.

Further, the paper cutter comprises a push-pull device; the side wall of the hollow cylinder body is provided with a notch, the push-pull device is movably provided in the notch, and one side of the push-pull device facing the hollow passage is provided with a movable matching surface; and when the push-pull device moves toward the interior of the hollow cylinder body, the movable matching surface enters the interior of the hollow cylinder body and compresses an inner diameter of the hollow passage.

Further, the paper cutter comprises an outer handle, and the outer handle is fixedly formed on an outer side wall of the hollow cylinder body; and the push-pull device further comprises a jointing portion for connecting the outer handle, and the jointing portion of the push-pull device is movably clamped and connected to the outer handle, so that the movable matching surface is movably provided in the notch.

Further, the outer handle is internally provided with an accommodating cavity, and the jointing portion of the push-pull device is inserted and connected to the interior of the accommodating cavity of the outer handle; and the outer handle is provided with a plurality of clamping groove structures, the plurality of clamping groove structures are closely arranged and interconnected along a linear direction, the jointing portion of the push-pull device is provided with snap-fit structures, and the snap-fit structures are alternatively snap-fitted in the clamping groove structures.

Further, one end of the strip-shaped slot is an open end, and the other end thereof is a closed end; a beginning section of the strip-shaped slot relative to an opening is a horn-shaped wide paper feed section, and the width of one side of the wide paper feed section facing the opening gradually increases.

Further, a limiting inclined surface is formed on the side wall of the hollow cylinder body, and the limiting inclined surface and the strip-shaped slot are on the same horizontal plane; a flat and straight section is connected to one side of the wide paper feed section facing away from the opening; the limiting inclined surface enables a narrowing section, a transition section and a limiting section to be formed on the paper feed passage in sequence along a direction of the closed end; the narrowing section is in communication with one side of the flat and straight section facing away from the wide paper feed section, and a width of the narrowing section gradually narrows down along a direction of one side of the closed end; and the closed end of the strip-shaped slot is located within the limiting section, and the limiting section is arranged obliquely relative to the transition section.

Compared with the prior art, the present application has the following beneficial effects:

during cutting, the free end of the roll paper is unrolled by a certain length, a roll tube portion of the roll paper penetrates and reaches into the hollow passage of the hollow cylinder body, the edge of the unrolled paper is inserted into the strip-shaped slot and slides to the cutting edge of the cutting blade all along the direction of a slot opening of the strip-shaped slot, then the paper cutter is pushed forward, and the strip-shaped slot can have a good limiting effect on the edge of the paper, so that the paper is not prone to shaking, and the cutting blade can be consistently and stably aligned with the edge of the paper, thereby ensuring cutting effect, stable cutting paths and smooth cut edges.

Since the sliding rail structure is provided on the hollow cylinder body, the cutting blade just needs to be directly pushed into the sliding rail structure from the bottom of the hollow cylinder body when mounted, which is quick and convenient to mount in less time with less effort. After the cutting blade is mounted in place, the cutting blade and the sliding rail structure realize tight abutting and limiting, an edge of the cutting edge directly faces the paper feed passage, and thus the cutting edge can be consistently and stably aligned with the edge of the paper in the cutting process.

(1) The paper cutter of the present application is stable in cutting process and good in cutting quality; (2) the blade is quick and convenient to mount, and the cutting blade can be directly pushed into the sliding rail structure from the bottom of the hollow cylinder body, and to demount or replace, the blade can be pulled out of sliding rails, which is also quick and convenient.

Figure 1:
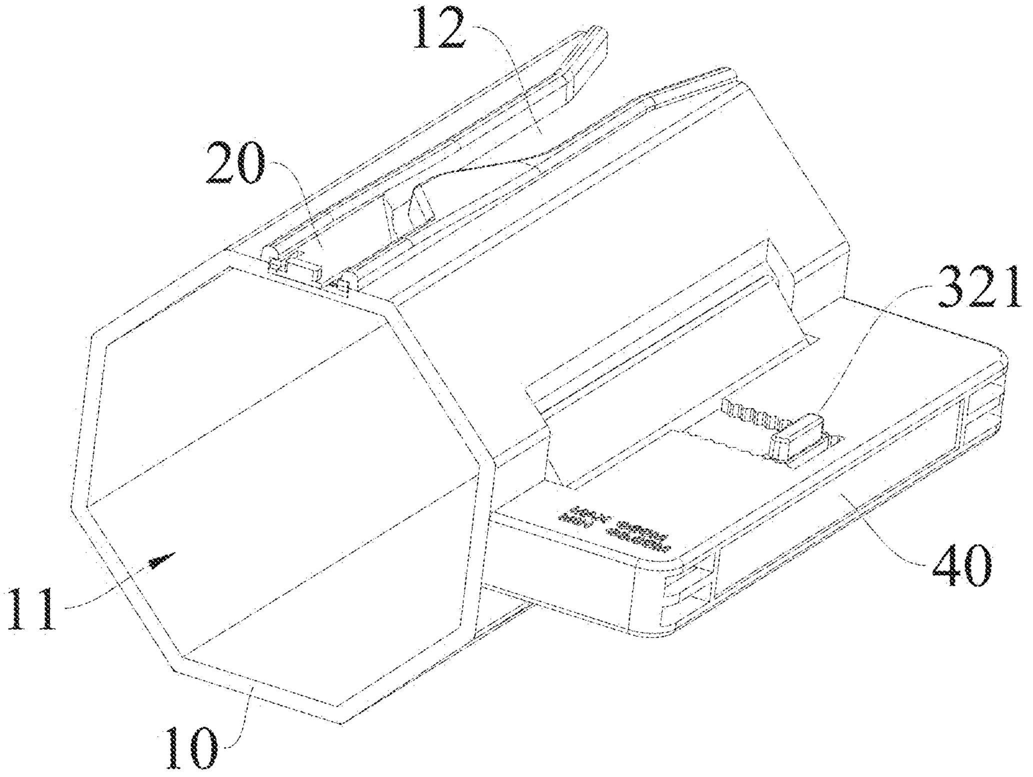
FIG. 1 is a three-dimensional diagram of the present application.

As shown in figures: 10, hollow cylinder body; 11, hollow passage; 12, strip-shaped slot; 121, wide paper feed section; 122, flat and straight section; 123, narrowing section; 124, transition section; 125, limiting section; 13, left cylinder body; 14, right cylinder body; 15, intermediate connecting portion; 151, limiting protruding column; 152, limiting inclined surface; 16, sliding rail structure; 17, notch; 20, cutting blade; 21, sliding connecting portion; 22, bottom sliding groove; 23, boss structure; 30, push-pull device; 31, movable matching surface; 32, jointing portion; 321, snap-fit structure; 40, outer handle; 41, clamping groove structure.

DETAILED DESCRIPTION OF EMBODIMENTS

The present application will be further described below in conjunction with the accompanying drawings and specific embodiments. It should be noted that, on the premise of no conflict, the embodiments and/or the technical features described below can be arbitrarily combined to form new embodiments.

In the description of the present application, it should be noted that orientations or positional relationships indicated by the terms such as “center”, “length”, “width”, “thickness”, “upper”, “lower”, “front”, “rear”, “left”, “right”, “vertical”, “horizontal”, “top”, “bottom”, “inner”, and “outer” are based on the orientations or positional relationships shown in the drawings, which are only for convenience of description and simplification of description of the present application but do not indicate or imply that the device or element referred to must have specific orientations and be constructed and operated in a specific orientation, and thus should not be construed as limiting the present application.

Moreover, the terms “first” and “second” are used for descriptive purposes only and are not to be construed as indicating or implying relative importance or implicitly indicating the number of the technical features indicated. Thus, the features defined as “first” or “second” may explicitly or implicitly comprise one or more of the features. In the description of the present application, the meaning of “plurality” is two or more, unless otherwise clearly and specifically limited.

In the description of the present application, it should be noted that unless otherwise expressly specified and limited, the terms "mount", "connect" and "attach" should be understood in a broad sense, for example, it can be fixedly connected, detachably connected, or integrally connected; it can be mechanically connected or electrically connected; and it can be directly connected or indirectly connected through an intermediate medium, and it can be an internal communication between two components or an interactive relationship between the two elements. The specific meanings of the above terms in the present application may be understood by those of ordinary skill in the art depending on specific circumstances.

The present application discloses a paper cutter, which is particularly suitable for cutting roll paper.

Referring to FIGS. 1-4, the present application includes a hollow cylinder body 10 and a cutting blade 20. The hollow cylinder body 10 is internally provided with a hollow passage 11 for a roll tube portion of roll paper to pass through; a side wall of the hollow cylinder body 10 is provided with a strip-shaped slot 12, a slot opening of the strip-shaped slot 12 forms a paper feed passage, one end of the strip-shaped slot 12 is an open end and penetrates through the bottom of the hollow cylinder body 10, and the other end thereof is a closed end. More specifically, based on the structure of the strip-shaped slot 12, the hollow cylinder body 10 can be divided by the strip-shaped slot into three parts, referring to FIG. 4, namely a left cylinder body 13 located on the left side of the strip-shaped slot 12, a right cylinder body 14 located on the right side of the strip-shaped slot 12, and an intermediate connecting portion 15 located above the strip-shaped slot 12.

Figure 5:
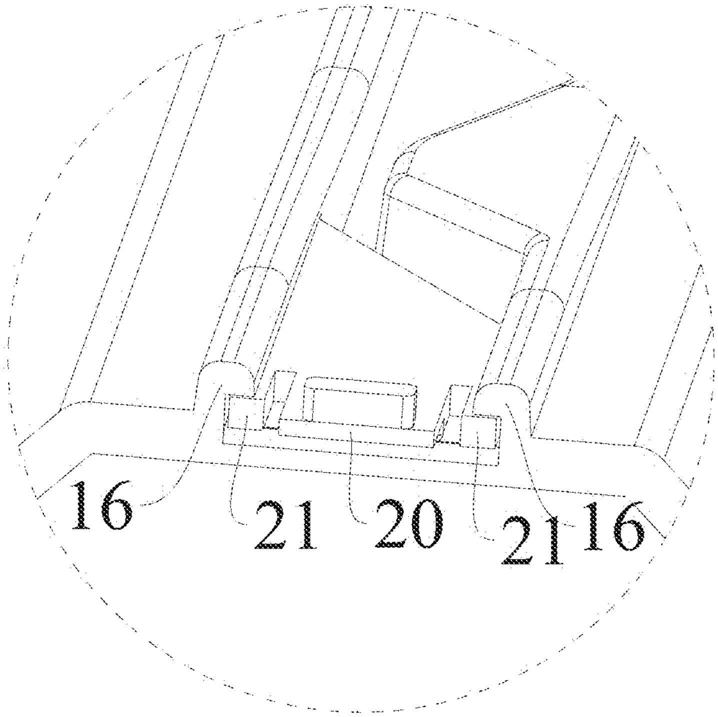
FIG. 5 is a schematic view of the cooperation of a cutting blade and a hollow cylinder body.

(1) Referring to FIG. 5, a sliding rail structure 16 is provided on the side wall of the hollow cylinder body 10. More specifically, the sliding rail structure 16 is provided on the intermediate connecting portion 15 of the hollow cylinder body 10, the sliding rail structure 16 extends to the bottom of the hollow cylinder body 10, one end of the sliding rail structure 16 close to the bottom of the hollow cylinder body 10 is provided with a bottom opening suitable for sliding insertion of the cutting blade 20, and the cutting blade 20 is slidably inserted and connected in the sliding rail structure 16, so that the cutting blade 20 is detachably connected to the hollow cylinder body 10. The sliding rail structure 16 is also internally provided with a limiting structure (a limiting form will be described in detail herein below) used for abutting against the cutting blade 20. After the cutting blade 20 is mounted in place, the cutting blade 20 will abut against the limiting structure to realize mounting and limiting, at the same time, an edge of a cutting edge of the cutting blade 20 directly faces the paper feed passage (see FIG. 2), and thus the edge of the cutting edge can also directly face the edge of the paper located inside the closed end.

During cutting, the free end of the roll paper is unrolled by a certain length, a roll tube portion of the roll paper penetrates and reaches into the hollow passage 11 of the hollow cylinder body 10, the edge of the unrolled paper is inserted into the strip-shaped slot 12 and slides all along the direction of the slot opening of the strip-shaped slot 12 until the edge of the paper abuts against the cutting edge of the cutting blade 20. In this way, the paper cutter continues to be pushed forward, and the strip-shaped slot 12 has a good clamping and positioning effect on the edge of the paper, so that the paper is not prone to shaking, and the cutting blade 20 can be consistently and stably aligned with the edge of the paper, thereby ensuring cutting effect, stable cutting paths and smooth cut edges.

Since the sliding rail structure 16 is provided on the hollow cylinder body 10, the cutting blade 20 just needs to be directly pushed into the sliding rail structure 16 from the bottom of the hollow cylinder body 10 when the cutting blade 20 is mounted (see FIG. 4), which is quick and convenient to mount in less time with less effort. After the cutting blade 20 is mounted in place, the cutting blade 20 and the sliding rail structure 16 realize tight abutting and limiting, the edge of the cutting edge directly faces the paper feed passage, and thus the cutting edge can be consistently and stably aligned with the edge of the paper in the cutting process.

(1) The paper cutter of the present application is stable in cutting process and good in cutting quality; (2) the blade is quick and convenient to mount, and the cutting blade 20 can be directly pushed into the sliding rail structure 16 from the bottom of the hollow cylinder body 10, and to demount or replace, the blade can be pulled out of sliding rails, which is also quick and convenient.

Figure 7:
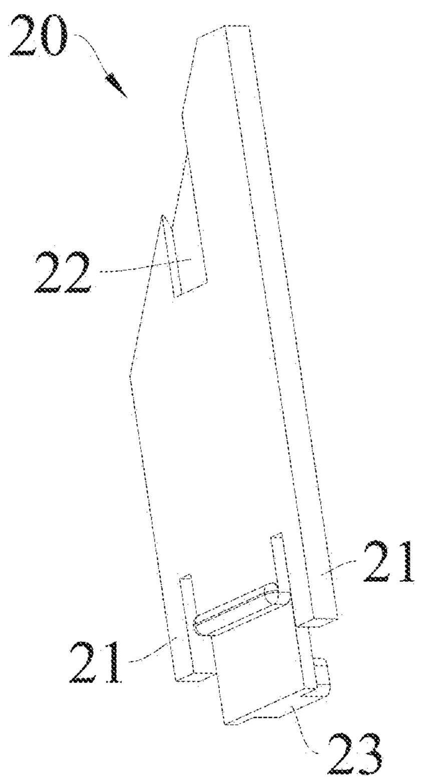
FIG. 7 is a structural schematic view of the cutting blade.

Specifically, referring to FIG. 5, the sliding rail structure 16 includes two sliding rails symmetrically arranged along two sides. Referring to FIG. 7, two sides of the cutting blade 20 are provided with sliding connecting portions 21, and the sliding connecting portions 21 are matched with the sliding rail structure 16 and are suitable for mutual sliding, so that the blade can be slidably mounted in the sliding rail structure 16.

To facilitate manually pushing the cutting blade 20 into the sliding rail structure 16, preferably, referring to FIG. 7, a boss structure 23 is further provided on a top surface of the cutting blade 20 in a protruding manner, and the boss structure 23 is located on one end of the cutting blade 20 opposite to the cutting edge.

Specifically, the cutting blade 20 and the sliding rail structure 16 have the following limiting cooperation form: one end of the sliding rail structure 16 is an opening for the sliding connecting portions 21 to enter, and the other end is a closed limiting surface, which is used to limit the cutting blade 20 during mounting. When one end of each of the sliding connecting portions 21 close to the cutting edge abuts against the limiting surface of the sliding rail structure 16, i.e., the cutting edge 20 has been mounted in place, the cutting edge of the cutting blade 20 directly faces the edge of the paper.

Figure 6:
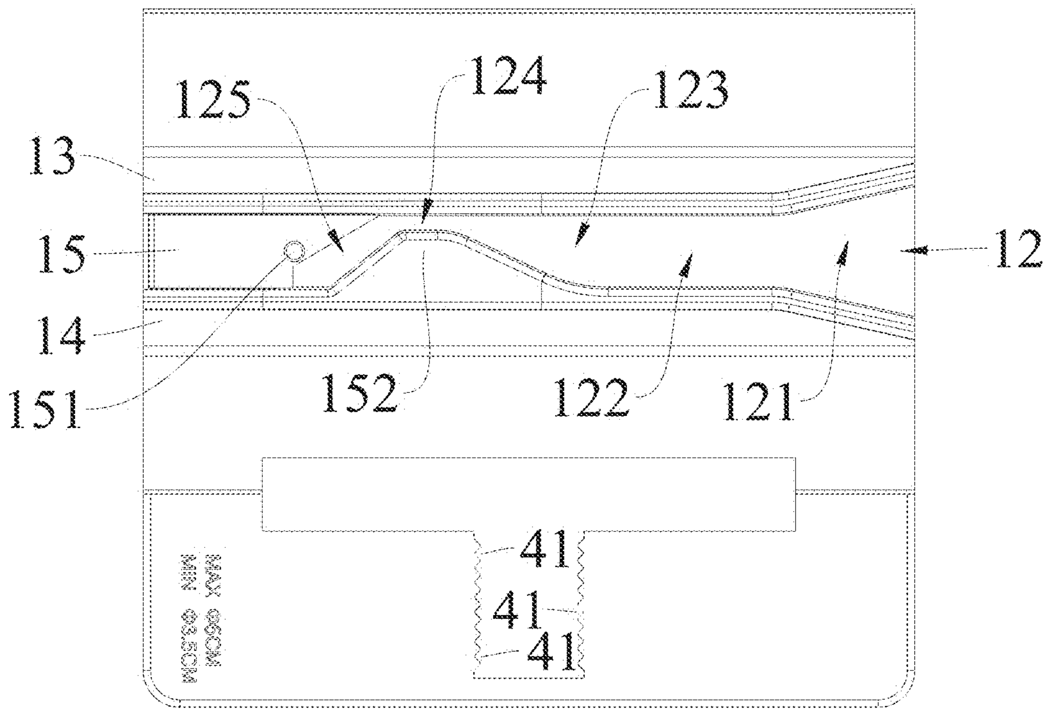
FIG. 6 is a top view of the hollow cylinder body.

Further, the cutting blade 20 and the sliding rail structure 16 have the following limiting cooperation form: referring to FIG. 6, a limiting protruding column 151 is further provided on the intermediate connecting portion 15 of the hollow cylinder body 10 in a protruding manner, and the limiting protruding column 151 is located between the two sliding rails; and correspondingly, referring to FIG. 7, a bottom surface of the cutting blade 20 is provided with a bottom sliding groove 22, and the limiting protruding column 151 is provided in the bottom sliding groove 22. When a user pushes the cutting blade 20 into the sliding rail structure 16 for mounting and the bottom sliding groove 22 abuts against the limiting protruding column 151 and limits the cutting blade 20, it means that the cutting blade 20 has been mounted in place, and the cutting edge of the cutting blade 20 directly faces the edge of the paper.

Furthermore, the present application also has an adjusting function and can be suitable for paper rolls of different diameters.

Figure 8:
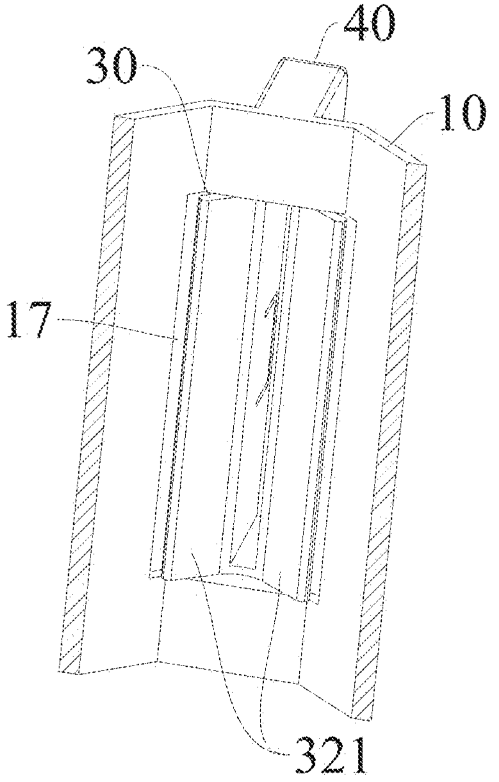
FIG. 8 is a schematic view of the cooperation of a push-pull device and the hollow cylinder body.
Figure 9:
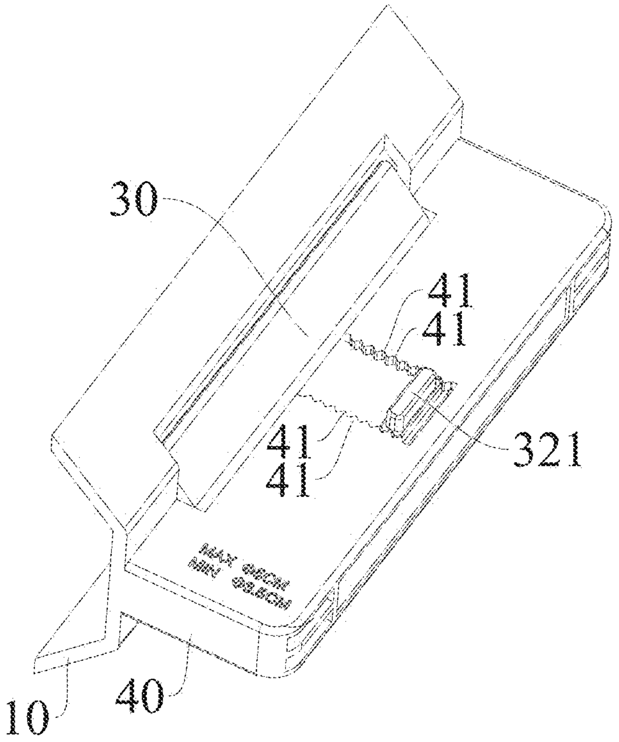
FIG. 9 is a schematic view of the cooperation of the push-pull device and an outer handle.

Specifically, the present application further includes a push-pull device 30. Referring to FIGS. 8-9, the side wall of the hollow cylinder body 10 is provided with a notch 17, the push-pull device 30 is movably provided in the notch 17, and one side of the push-pull device 30 facing the hollow passage 11 is provided with a movable matching surface 31. When the push-pull device 30 moves toward the interior of the hollow cylinder body 10, the movable matching surface 31 enters the interior of the hollow cylinder body 10, thereby compressing an inner diameter of the hollow passage 11; and conversely, as the push-pull device 30 exits from the interior of the hollow cylinder body 10 and returns completely into the notch 17, the inner diameter of the hollow passage 11 increases again. According to the present application, by adjusting the position of the push-pull device 30, the inner diameter of the hollow passage 11 can be adjusted, allowing the paper cutter to be adaptable to paper rolls of different diameters.

More specifically, referring to FIG. 9, the present application further includes an outer handle 40, and the outer handle 40 is fixedly formed on an outer side wall of the hollow cylinder body 10. The push-pull device 30 also includes a jointing portion 32 for connecting the outer handle 40, and the jointing portion 32 is movably clamped and connected to the outer handle 40, so that the movable matching surface 31 is movably arranged in the notch 17, which can enter or exit from the interior of the hollow cylinder body 10, thereby changing the inner diameter of the hollow passage 11.

More specifically, the outer handle 40 and the push-pull device 30 are movably clamped and connected to realize the multi-position adjustment using the structure below. The outer handle 40 is internally provided with an accommodating cavity, and the jointing portion 32 of the push-pull device 30 is integrally inserted into the accommodating cavity of the outer handle 40; continuously referring to FIG. 9 and FIG. 6, a plurality of clamping groove structures 41 are punched on the outer handle 40, and the plurality of clamping groove structures 41 are closely arranged and interconnected along a linear direction. Accordingly, the jointing portion 32 of the push-pull device 30 is provided with snap-fit structures 321 protruding therefrom, and the snap-fit structures 321 are snap-fitted in one of the clamping groove structures 41; and when the push-pull device 30 is pushed, the snap-fit structures 321 will move in the plurality of clamping groove structures 41, so that the movable matching surface 31 stretches and retracts in the hollow cylinder body 10, thereby adjusting the size of the hollow passage 11.

Certainly, to ensure the stability of the movable clamping, the top and bottom of the outer handle 40 are symmetrically provided with the same number of clamping groove structures 41 in the same positions, correspondingly, the top and bottom of the jointing portion 32 of the push-pull device 30 are symmetrically provided with two snap-fit structures 321, and the two upper and lower snap-fit structures 321 are simultaneously clamped in the upper and lower clamping groove structures 41, thereby increasing stability.

Preferably, the slot opening of the strip-shaped slot 12 forms the paper feed passage. Referring to FIG. 6, a beginning section of the paper feed passage relative to an opening thereof is a horn-shaped wide paper feed section 121, and the width of one side of the wide paper feed section 121 facing the opening gradually increases. In this way, the opening of the paper feed passage is flared, facilitating storing the edge of the paper into the paper feed passage.

Figure 2:
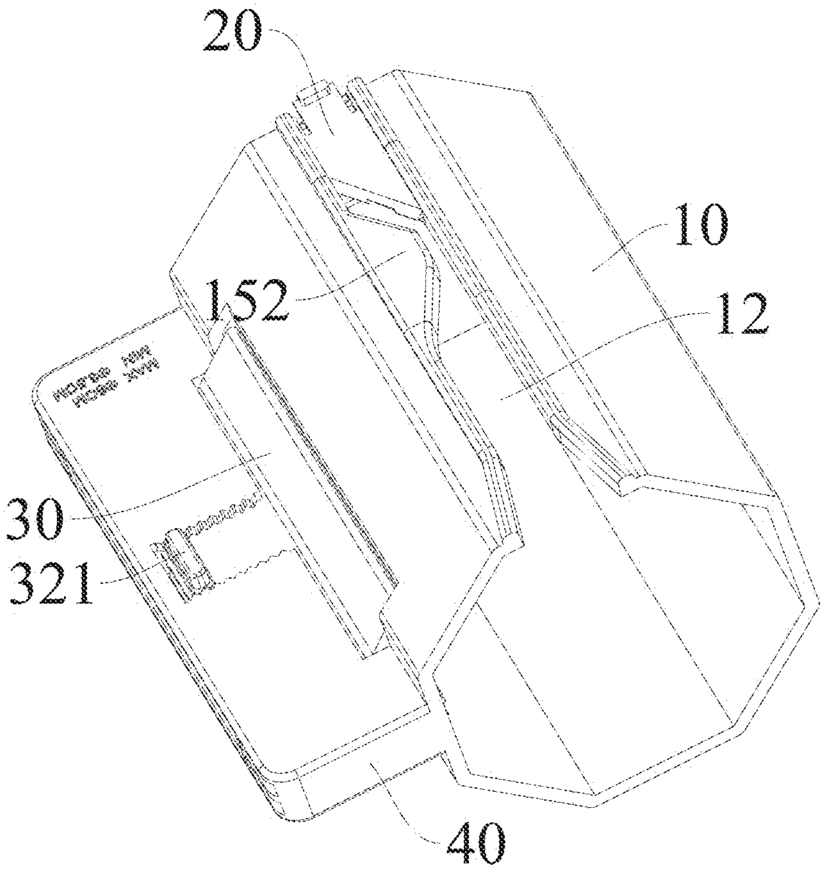
FIG. 2 is a three-dimensional diagram of the present application from another angle.
Figure 3:
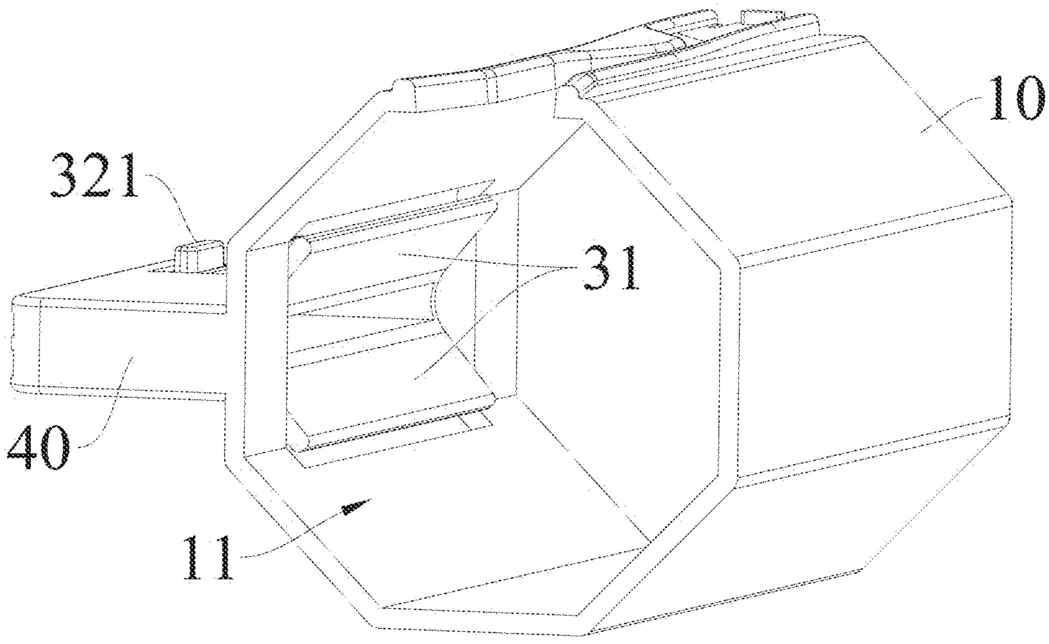
FIG. 3 is a three-dimensional diagram of the present application from yet another angle.
Figure 4:
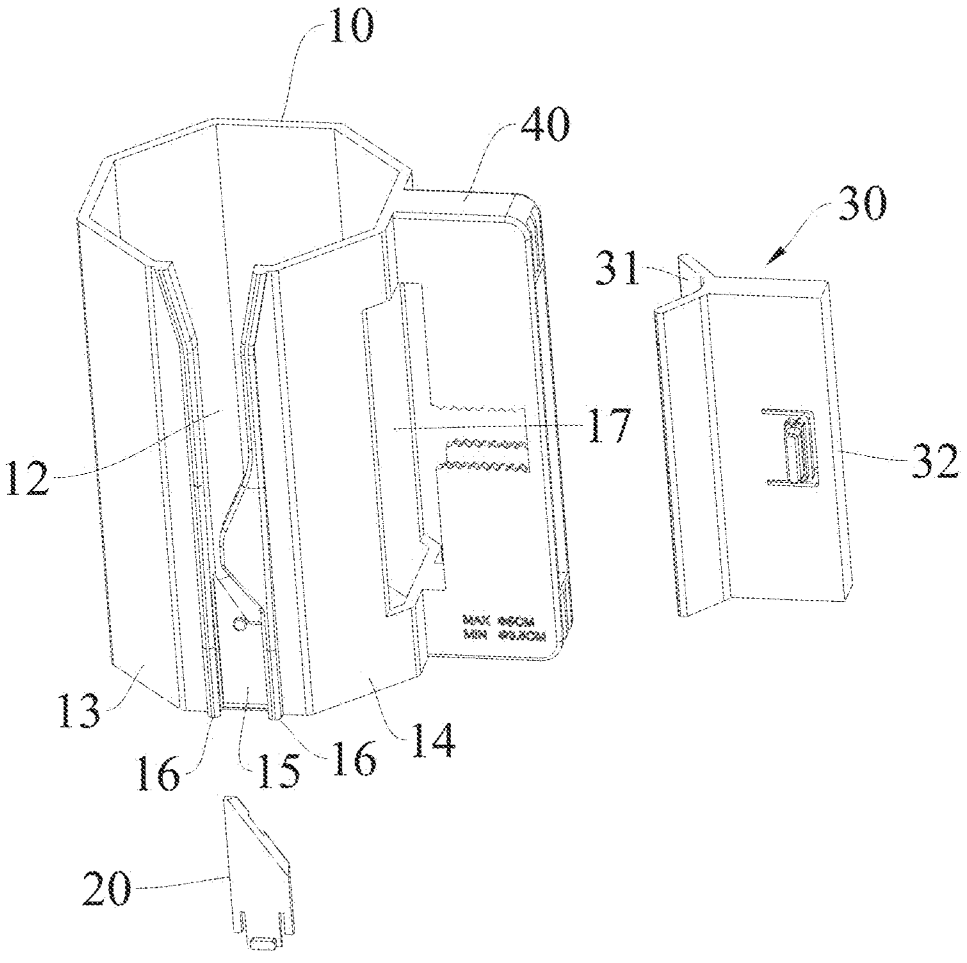
FIG. 4 is an exploded schematic view of the present application.

Further, referring to FIG. 6 and FIG. 2, a limiting inclined surface 152 is formed on the intermediate connecting portion 15 of the hollow cylinder body 10, and the limiting inclined surface 152 and the strip-shaped slot 12 are on the same horizontal plane. A flat and straight section 122 is connected to one side of the wide paper feed section 121 facing away from the opening, and the flat and straight section 122 is of a horizontal and straight shape. The shape of the limiting inclined surface 152 enables a narrowing section 123, a transition section 124 and a limiting section 125 to be formed on the paper feed passage in sequence along a direction of the closed end; the narrowing section 123 is connected to one side of the flat and straight section 122 facing away from the wide paper feed section 121, and a width of the narrowing section 123 gradually narrows down along a direction of one side of the closed end; and the closed end of the strip-shaped slot 12 is located within the limiting section 125, and the limiting section 125 is arranged obliquely relative to the flat and straight section 122.

During paper feeding, the paper firstly passes through the wide paper feed section 121, enters the paper feed passage, and then passes through the flat and straight section 122, and a passage of the narrowing section 123 gradually narrows down, so that the paper is not buckled and is straightly fed into the transition section 124; and then the paper enters the limiting section 125, realizing constraints on the edge of the paper. Since the limiting section 125 and the transition section 124 are obliquely arranged, equivalently the limiting inclined surface 152 abuts against a side surface of the paper, and the surface of the paper is tensioned, which facilitates the blade consistently and accurately acting on the edge of the paper during cutting, and ensures the cutting quality.

The above-mentioned embodiments are merely preferred embodiments of the present application, which cannot be used to define the scope of protection of the present application, and any insubstantial changes and substitutions made by those skilled in the art based on the present application fall within the scope of protection of the present application.

What is claimed is:

1. A paper cutter, comprising:

a hollow cylinder body, wherein the hollow cylinder body is internally provided with a hollow passage for a roll shaped structure to pass through; a side wall of the hollow cylinder body is provided with a strip-shaped slot forming a paper feed passage; a sliding rail structure is provided on the side wall of the hollow cylinder body; the sliding rail structure extends to a bottom of the hollow cylinder body; and one end of the sliding rail structure close to the bottom of the hollow cylinder body is provided with a bottom opening suitable for sliding insertion of a cutting blade, and the sliding rail structure is internally provided with a limiting structure for abutting against the cutting blade; and the cutting blade is slidably inserted and connected in the sliding rail structure, wherein when the cutting blade is mounted in the sliding rail structure, a cutting edge of the cutting blade directly faces the paper feed passage;

the paper cutter further comprises a push-pull device, the side wall of the hollow cylinder body is provided with a notch, the push-pull device is movably provided in the notch, and one side of the push-pull device facing the hollow passage is provided with a movable matching surface; and when the push-pull device moves toward an interior of the hollow cylinder body, the movable matching surface enters the interior of the hollow cylinder body and compresses an inner diameter of the hollow passage.

2. The paper cutter according to claim 1, wherein the sliding rail structure comprises two sliding rails arranged symmetrically along two sides; and two sides of the cutting blade are provided with sliding connecting portions, and the sliding connecting portions are matched with the sliding rail structure and are suitable for mutual sliding.

3. The paper cutter according to claim 2, wherein one end of the sliding rail structure is an opening for the sliding connecting portions to enter, and the other end of the sliding rail structure is a closed limiting surface; and when one end of each of the sliding connecting portions close to the cutting edge abuts against the limiting surface of the sliding rail structure, the cutting edge of the cutting blade directly faces the paper feed passage.

4. The paper cutter according to claim 2, wherein the side wall of the hollow cylinder body is further provided with a limiting protruding column protruding therefrom, the limiting protruding column is located between the two sliding rails, a bottom surface of the cutting blade is provided with a bottom sliding groove, and the limiting protruding column is provided in the bottom sliding groove; and when the bottom sliding groove abuts against the limiting protruding column and limits the cutting blade, the cutting edge of the cutting blade directly faces the paper feed passage.

5. The paper cutter according to claim 1, wherein a boss structure is further provided on a top surface of the cutting blade in a protruding manner to facilitate pushing and pulling the blade by a hand, and the boss structure is located at one end of the cutting blade opposite to the cutting edge.

6. The paper cutter according to claim 1, further comprising an outer handle, wherein the outer handle is fixedly formed on an outer side wall of the hollow cylinder body; and the push-pull device further comprises a jointing portion for connecting the outer handle, and the jointing portion of the push-pull device is movably clamped and connected to the outer handle, so that the movable matching surface is movably provided in the notch.

7. The paper cutter according to claim 6, wherein the outer handle is internally provided with an accommodating cavity, and the jointing portion of the push-pull device is inserted and connected to the interior of the accommodating cavity of the outer handle; and the outer handle is provided with a plurality of clamping groove structures, the plurality of clamping groove structures are closely arranged and interconnected along a linear direction, the jointing portion of the push-pull device is provided with snap-fit structures, and the snap-fit structures are alternatively snap-fitted in the clamping groove structures.

8. The paper cutter according to claim 1, wherein one end of the strip-shaped slot is an open end, and the other end thereof is a closed end; and a beginning section of the strip-shaped slot relative to an opening is a horn-shaped wide paper feed section, and the width of one side of the wide paper feed section facing the opening gradually increases.

9. The paper cutter according to claim 8, wherein a limiting inclined surface is formed on the side wall of the hollow cylinder body, and the limiting inclined surface and the strip-shaped slot are on the same horizontal plane;

a flat and straight section is connected to one side of the wide paper feed section facing away from the opening;

the limiting inclined surface enables a narrowing section, a transition section and a limiting section to be formed on the paper feed passage in sequence along a direction of the closed end;

the narrowing section is in communication with one side of the flat and straight section facing away from the wide paper feed section, and a width of the narrowing section gradually narrows down along a direction of one side of the closed end; and the closed end of the strip-shaped slot is located within the limiting section, and the limiting section is arranged obliquely relative to the transition section.

* * * * *